US006754837B1

(12) United States Patent
Helms

(10) Patent No.: US 6,754,837 B1
(45) Date of Patent: Jun. 22, 2004

(54) PROGRAMMABLE STABILIZATION INTERVAL FOR INTERNAL STOP GRANT STATE DURING WHICH CORE LOGIC IS SUPPLIED WITH CLOCKS AND POWER TO MINIMIZE STABILIZATION DELAY

(75) Inventor: Frank P. Helms, Round Rock, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 646 days.

(21) Appl. No.: 09/617,382

(22) Filed: Jul. 17, 2000

(51) Int. Cl.[7] .................................................. G06F 1/26
(52) U.S. Cl. ...................................... 713/322; 327/114
(58) Field of Search .......................... 713/322; 327/114

(56) References Cited

U.S. PATENT DOCUMENTS

| | | | | |
|---|---|---|---|---|
| 5,655,127 A | * | 8/1997 | Rabe et al. ................. | 713/322 |
| 5,745,375 A | | 4/1998 | Reinhardt et al. .......... | 364/492 |
| 5,778,237 A | * | 7/1998 | Yamamoto et al. ......... | 713/322 |
| 5,789,952 A | * | 8/1998 | Yap et al. .................... | 327/114 |
| 5,812,860 A | | 9/1998 | Horden et al. ......... | 395/750.04 |
| 5,822,596 A | * | 10/1998 | Casal et al. ................. | 713/322 |
| 5,852,737 A | | 12/1998 | Bikowsky ............... | 395/750.05 |
| 5,873,000 A | | 2/1999 | Lin et al. .................... | 395/892 |
| 5,881,298 A | | 3/1999 | Cathey .................. | 395/750.06 |
| 5,884,049 A | | 3/1999 | Atkinson .................... | 395/281 |
| 5,887,179 A | | 3/1999 | Halahmi et al. ........ | 395/750.06 |
| 5,925,133 A | | 7/1999 | Buston et al. ............... | 713/323 |
| 5,983,355 A | * | 11/1999 | Kenny et al. ................ | 713/322 |
| 6,014,611 A | | 1/2000 | Arai et al. ................... | 702/132 |

FOREIGN PATENT DOCUMENTS

EP          0 632 360 A1     1/1995

JP          08328698         12/1996

OTHER PUBLICATIONS

Advanced Micro Devices, Inc., "AMD PowerNow! Technology Informational White Paper", Pub. #24404 Rev. A, Nov. 2000.*
Marc Fleischman, Transmeta Corporation, "Crusoe LongRun Power Management", Jan. 17, 2001.*
Intel, "Suspend/Resume and Power Plane Control", http://developer.intel.com/design/intarch/techinfo/430TX/pwrsus-.htm, Apr. 13, 1999, pp. 1–29.
IBM Technical Disclosure Bulletin "Power Management Clock Change for 603 Processor", vol. 38, No. 12, Dec. 1995, pp. 325–327.
U.S. Patent Application filed Jun. 26, 2000, entitled "Method and Apparatus for Specifying Core Voltage for a Microprocessor", by Qadeer Ahmad Qureshi et al. (Application No. 09/603,511).

* cited by examiner

Primary Examiner—Thomas Lee
Assistant Examiner—Albert Wang
(74) Attorney, Agent, or Firm—Zagorin, O'Brien & Graham LLP

(57) ABSTRACT

An integrated circuit provides for changes to its core clock frequency and its core voltage using software programmable registers on the processor to store voltage ID (VID) values to specify core voltage, which are supplied to a voltage regulator and clock frequency control values, which are supplied to clock generation logic on the integrated circuit to specify core clocks. The integrated circuit generates an internal state in which its core clocks are stopped or slowed and during which core voltage and core frequency are adjusted. The processor also includes a timing mechanism that allows the new voltage and clock frequency to stabilize before resuming core operations. The timing mechanism may include a programmable count to specify the time to allow the new voltage and clock frequency to stabilize.

26 Claims, 4 Drawing Sheets

PROGRAMMABLE STABILIZATION INTERVAL FOR INTERNAL STOP GRANT STATE DURING WHICH CORE LOGIC IS SUPPLIED WITH CLOCKS AND POWER TO MINIMIZE STABILIZATION DELAY

BACKGROUND OF THE INVENTION

1. Field of the Invention

This invention relates to processors and more specifically to dynamically controlling processor voltage and frequency.

2. Description of the Related Art

Integrated circuits such as microprocessors can be run at different clock speeds and with different supply voltages. The selection of the appropriate clock speed and appropriate voltage depends on many factors. A higher clock speed requires a higher supply voltage. In addition, the higher clock speed results in additional heat and power being dissipated. Microprocessors utilized in mobile applications, i.e., those used in battery powered systems, are particularly sensitive to power considerations and therefore generally require the lowest supply voltage that can achieve the rated clock speed. That is in part due to the small, densely packed system construction that limits the ability of the computer system to safely dissipate the heat generated by computer operation.

Many power saving techniques have been introduced to try and mitigate the limitations caused by thermal and battery power constraints. The frequency of operation (clock frequency) of the processor and its operating voltage determines its power consumption. Since power consumption and therefore heat generation are roughly proportional to the processor's frequency of operation, scaling down the processor's frequency has been a common method of staying within appropriate power limitations.

A common power management technique called "throttling" prevents the processor from over heating by temporarily placing the processor in a stop grant state. During the stop grant state the processor does not execute operating system or application code and typically has its clocks gated internally to reduce power consumption. Throttling is an industry standard method of reducing the effective frequency of processor operation and correspondingly reducing processor power consumption by using a clock control signal (e.g. the processor's STPCLK# input) to modulate the duty cycle of processor operation. A temperature sensor monitors the processor temperature to determine when throttling is needed. Throttling continuously stops and starts processor operation and reduces the effective speed of the processor resulting in reduced power dissipation and thus lowering processor temperature.

Referring to FIG. 1, one prior art system capable of implementing throttling is illustrated. Processor (CPU) 101 receives voltage 102 from voltage regulator 103. The voltage regulator is controlled by voltage identification (VID) signals 104 which are set by system jumper settings 105. A clock multiplier value 107, supplied from system jumper settings 105 (bus frequency (BF)[2:0]) is supplied to CPU 101. CPU 101 multiplies a received bus clock 109 by the multiplier value 107 to generate the core clocks for the processor.

CPU 101 receives a STPCLK# (the # sign indicates the signal is active low) input, which is used to temporarily suspend core clock operation and conserve power. An asserted STPCLK# signal results in the processor entering a stop grant state. In that state, execution of operating system (OS) and application code is stopped, and the core clocks are typically stopped although some minimum logic including clock multiplier logic may still operate.

While throttling is effective to reduce power consumption, it would be desirable to dynamically adjust the operating frequency and voltage of the processor to match operating conditions. For example, microprocessors, particularly those used in battery powered systems, sometimes operate in environments where external power is available, e.g., from an AC adapter or in docking stations. In such circumstances, it would be desirable to operate the processor with increased performance. That is, to provide higher supply voltage and higher clock speeds. Therefore, it would be desirable if the computer system could adapt readily to its environment in order to provide the appropriate level of performance given the operating environment. Further, it would be preferable to dynamically adjust to the demands of the various environments without the need for chipset or other external support. It is also desirable to adjust processor voltage and frequency based on CPU utilization by the applications which are running on the processor. That would allow for the processor to save power when its full computing bandwidth is not required.

SUMMARY OF THE INVENTION

Accordingly, the invention provides a processor that can enter an internally generated stop grant state in which the processor does not execute operating system or application code and during which, processor operating voltage and frequency can be changed. The stop grant state can be entered by accessing a predetermined register on the processor. The invention further provides the ability to write to registers on the processor to specify new voltage and frequency control values to dynamically provide operating voltage and frequencies that correspond to the current operating environment. The new voltage and frequency control values are applied to appropriate control logic during the internally generated stop grant state. An internal count circuit is utilized to determine the duration of the internally generated stop grant state. That count circuit may also be programmable to adjust the duration of the internally generated stop grant state.

According to an embodiment of the present invention, changes to core clock frequency and core voltage are made by writing to software programmable locations on the processor to store voltage ID (VID) values to specify core voltage and clock frequency control values, which are supplied to the clock generation logic to specify core clock frequency. The processor enters an internal stop grant state in which the processor does not execute operating system or application code. After entering the stop grant state, the processor core voltage and core frequency may be adjusted. A timing mechanism on the processor allows the new voltage and clock frequency to stabilize before exiting the stop grant state and resuming code execution. The timing mechanism may include a programmable count to specify the time to allow the new voltage and clock frequency to stabilize.

In another embodiment, the invention provides a method for changing frequency of a core clock being supplied to a core logic region of an integrated circuit. The method includes accessing a control register in the integrated circuit. In response to accessing the control register, execution of operating system and application code in the core logic region is stopped and the processor enters a stop grant state.

Once in the stop grant state, new clock control values may be applied to clock generation logic on the processor. After an interval determined according to a count circuit in the integrated circuit, the stop grant state is exited and the processor resumes execution of operating system and application code. The method further includes writing a new voltage control value to a software programmable voltage control register in the processor and applying the new voltage control value during the internally generated stop grant state.

BRIEF DESCRIPTION OF THE DRAWINGS

The present invention may be better understood, and its numerous objects, features, and advantages made apparent to those skilled in the art by referencing the accompanying drawings.

Note that the use of the same reference symbols in different drawings indicates similar or identical items.

DESCRIPTION OF THE PREFERRED EMBODIMENT(S)

Central processing unit (CPU) thermal and power management are improved by changing CPU voltage and clock frequency dynamically to match changes in the performance requirements, power consumption limitations and power dissipation limitations to provide improved performance and/or battery life to the user. Since processor frequency determines a minimum required voltage for operation, the voltage and frequency of operation for the processor core are preferably changed at the same time. Reducing voltage along with frequency is an effective way of reducing the power consumption of the system's processor when the environment is power or thermally constrained or when power conservation is desired. Similarly, in order to achieve high performance levels, operating voltage typically has to be increased to provide increased processor frequency. Note that for computers utilizing batteries as a power source, battery life is enhanced by allowing the voltage provided to the CPU to be the least possible to assure proper operation at the target frequency of operation. In effect, this enables the lowest possible CPU power consumption at a given frequency of operation. With the ability to dynamically change CPU voltage and frequency, the system is now better able to optimize power and frequency within specified limits. In addition, thermal management is now better optimized for a given frequency of CPU operation.

Figure 1:
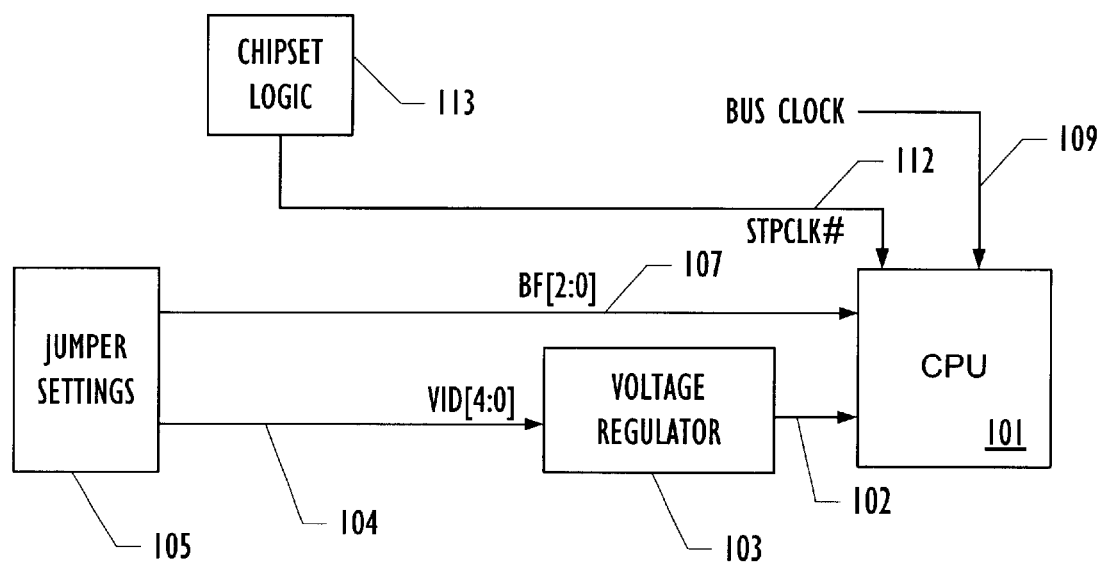
FIG. 1 illustrates a prior art system in which throttling may be used to reduce power consumed by the processor.
Figure 2:
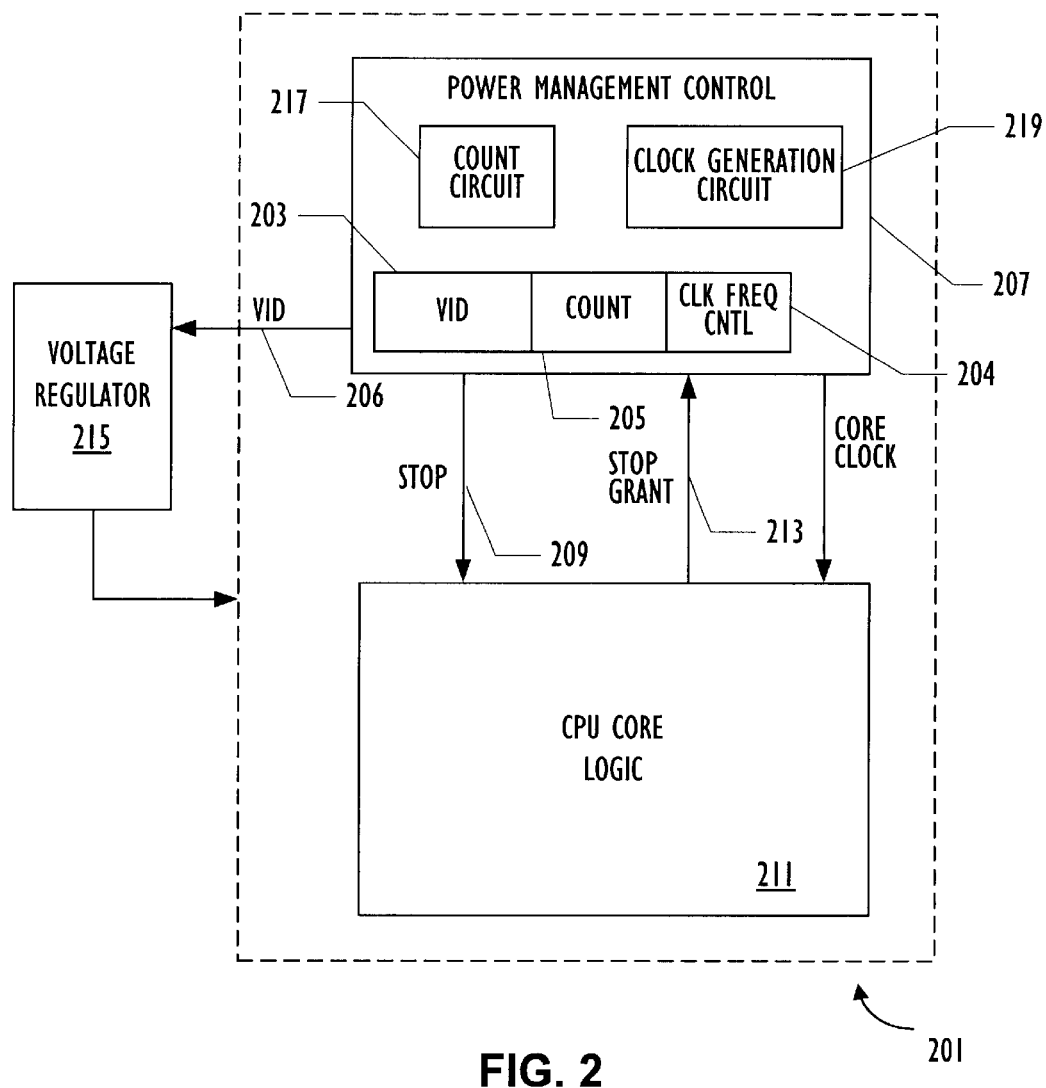
FIG. 2 illustrates an embodiment of the invention in which programmable registers on the processor are used to specify the operating frequency and voltage of the core logic.

Referring to FIG. 2, a processor is shown that can dynamically adjust its operating voltage and frequency to provide better thermal and power management. Processor 201 includes a programmable VID field 203, core clock frequency control field 204 and count field 205. Those fields may be located in one or more programmable registers. When the processor and/or system determines that a change to the operating voltage and/or frequency is desired, e.g., to provide increased performance or reduced power consumption, the desired frequency and voltage control information are loaded into clock frequency control field 204 and VID field 203, respectively. Access to a register containing those fields or an access to another register location is used as a trigger to indicate that the processor should enter a stop grant state in which execution of operating system and application code is stopped. The access may result from, e.g., execution of a processor read or write instruction and in response to that access, power management control logic 207 supplies a stop signal 209 or other indication to indicate to CPU core logic 211 that the CPU core should stop execution of operating system and application code in order to enter a stop grant state.

Depending upon the processor implementation, stop signal 209 causes the processor to finish executing the current instruction, complete any current bus transactions and leave the host bus in an appropriate state or take any other necessary action prior to stopping code execution. Once the processor has completed all necessary preparations to enter the stop grant state, which vary depending on processor implementation, CPU core logic 211 supplies an asserted stop grant signal 213 or other indication to indicate to power management control logic 207 that CPU core logic 211 has entered the internally generated stop grant state. It is internally generated since an access to a register location within processor 201 caused the stop grant state rather than an external signal.

During the stop grant state, the processor can transition the voltage and frequency to the new states specified in VID field 203 and clock frequency control field 204. In some processor implementations, the processor core clocks are stopped after the processor enters the stop grant state. In other processor implementations, the processor core clock frequency is reduced to a frequency which can safely tolerate desired voltage changes.

In one implementation clock control frequency information is supplied as multiplier values for a clock that is supplied to processor 201. Those of skill in the art appreciate that many other approaches can be used to specify the core operating frequency. For example, clock frequency control signals 209 may be supplied to a voltage controlled oscillator (VCO) or other clock generation logic to directly specify a core clock frequency directly rather than supplying a multiplier value.

In either case, the voltage control information specified in VID field 203 is supplied to voltage regulator 215 which in turn supplies CPU core logic 211 with the new voltage during the stop grant state. In some implementations as described further herein, that voltage is supplied only to CPU core logic and peripheral logic is powered on another power plane. In other implementations, the processor is powered by a single power plane and changes in supply voltage from voltage regulator 215 also affects power management control logic 207.

Because changing the voltage and frequency can not be done instantaneously, the stop grant state needs to be maintained for a period of time to allow the new voltage and clock frequency to stabilize. That time period is controlled through count circuit 217. Count circuit 217 begins counting once stop grant signal 213 is asserted, that is, once the stop grant state begins. The count circuit 217 is designed to count a sufficient amount of time for the voltage and frequency changes to stabilize. In one embodiment, as illustrated in FIG. 2, that time period is programmable through count register 205, which specifies the duration of the stop grant state. Once count circuit 217 has counted to the programmed count value, the power management control logic 207 causes stop signal 209 to be deasserted, which indicates to CPU core logic 211 that it should exit the stop grant state. On exiting the stop grant state, CPU core logic 217 resumes executing operating system and application code.

In some processor implementations, CPU core logic 217 may resume executing code at the new clock frequency immediately on exiting the stop grant state. In other implementations, for example, when CPU core logic executes at a reduced clock speed during the stop grant state, clock generation logic 211 may increase the core clock speed in increments up to the newly specified operating frequency after exiting the stop grant state and the CPU core may resume execution of OS and application code after the core clock speed is at the specified operating frequency.

Figure 3:
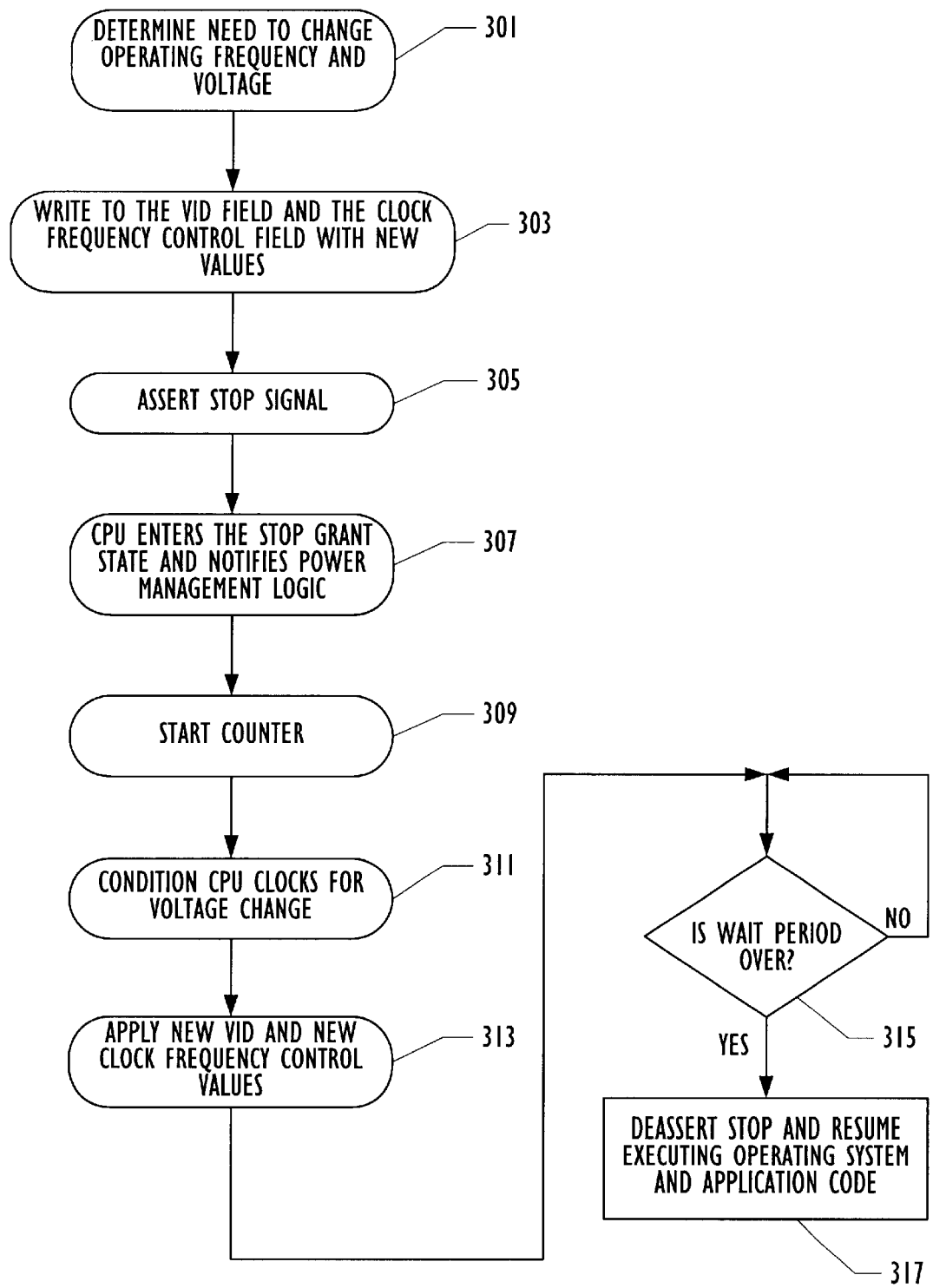
FIG. 3 illustrates the high level operation a processor shown in FIG. 2 in accordance with one embodiment of the invention.

Referring to FIG. 3, the high level operation of processor 201 in accordance with one embodiment of the invention is described. In 301, the processor (or system) determines there is a need to change operating frequency and voltage to, e.g., save power or enhance performance. The processor then writes desired voltage values to VID field 203 and desired frequency of operations to clock frequency control field 204 to specify a new frequency in 303. The fields may be located in one or more model specific registers. In addition to writing fields 203 and 204, if necessary, the processor can write to count field 205 to specify the duration of the stop grant state. An access to a register containing those fields (or a read or write access to another register or an instruction) may be used as an indication to begin the process of entering the stop grant state.

Once that indication is received, and the CPU core logic receives a request to enter the stop grant state in 305, the CPU takes all necessary actions to place the CPU in the stop grant state (e.g., completing instructions and/or bus cycles) and then asserts stop grant signal 213 to power management control logic 207 in 307 to indicate that the CPU has entered the stop grant state.

The asserted stop grant signal from CPU core 213 causes the count circuit 217 to begin counting in 309. The count circuit 217 determines the duration of the stop grant state. Note that writing to the count field 205 may be omitted under certain circumstances. For example, the count circuit may be hard coded to wait a sufficient time for the new voltage and frequency values to stabilize. Alternatively, the count field may maintain its previous value and thus only has to be written once. In any case, once in the stop grant state, CPU clocks are stopped or reduced by clock generation circuit 219 to condition the CPU clocks in 311 to permit the desired voltage changes.

During the stop grant state, the new VID values are applied to voltage regulator 215 and the new clock frequency control values are supplied to clock generation circuit 219 in 313. Clock generation circuit 219 typically includes a phase locked loop (PLL) and the circuit takes some time to lock in to the new frequency. Even if the PLL is generating a stable new clock at the desired frequency, the CPU core is still getting either no clock or a divided down clock as the voltage stabilizes. After the count has expired, i.e., the waiting period in 315 is determined to be over, power management control logic 207 deasserts its stop signal and the CPU core logic 211 resumes executing code in 317.

In one embodiment, processor 201 may have programmable modes in which it can still operate based on an external STPCLK# signal. In that case, rather than automatically asserting its internal stop core clocks signal, when, e.g., a register with fields 203–205, is accessed, the processor uses an external STPCLK# signal or message to control stopping and starting core clocks.

Figure 4:
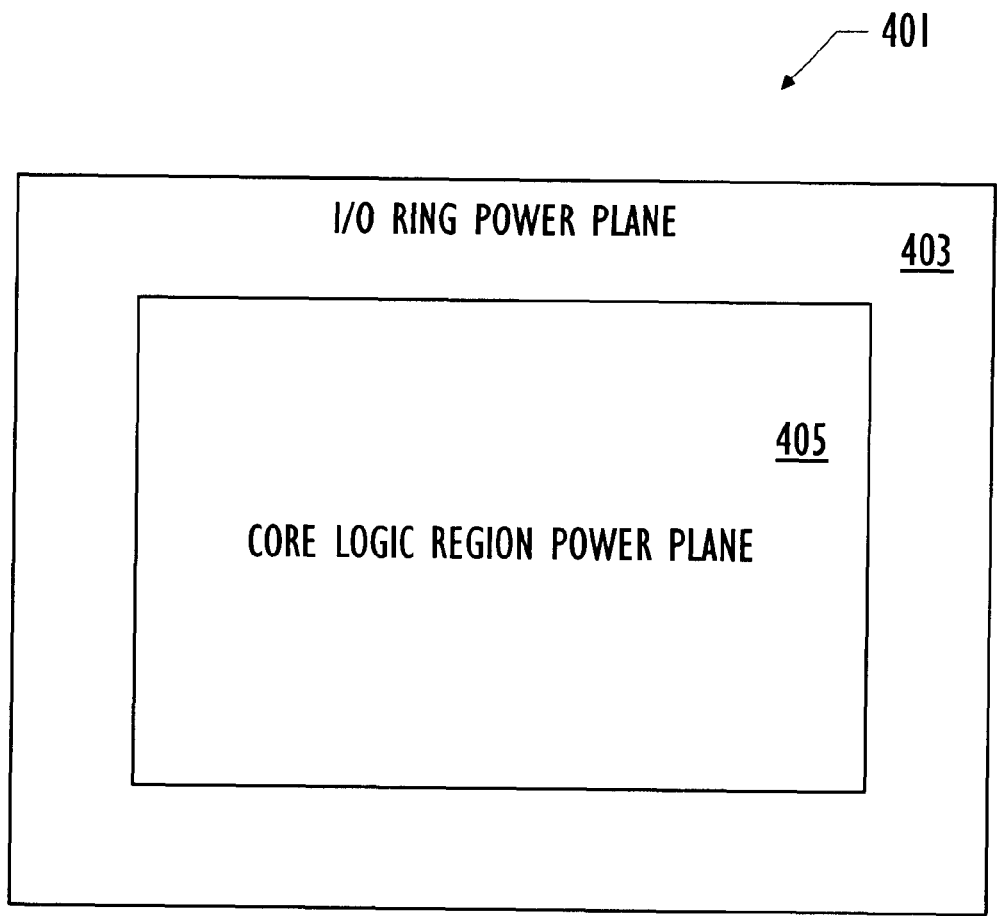
FIG. 4 depicts various power planes of an integrated circuit which may be utilized in an embodiment of the present invention.

The circuits in power management control 207 associated with changing the voltage and frequency of operation of the CPU core 211 need to remain operational while the core logic is in the stop grant state. One way to accomplish that is to ensure that the necessary logic to control the power management logic including the programmable VID, clock frequency control and the count are powered by a separate power plane and/or clock domain from the core logic. That way, changes to core voltage do not effect power management logic. Referring to FIG. 4, a simplified block diagram illustrates one approach for this. The integrated circuit 401 is divided into an input/output (I/O) ring power plane 403 and core logic region 405. Core logic region 405 receives a core clock and core voltage separate from logic in I/O ring power plane 403. While only two power planes are shown, integrated circuit 401 may in fact have multiple power planes according to the requirements of a particular system and integrated circuit implementation. In other embodiments, only a single power plane is provided. In such embodiments, the frequency of operation of the power management logic must be sufficiently low to handle the lowest voltage that is supplied to CPU core logic 217.

As described herein, the whole transition to a new operating voltage and frequency can occur without the need for any external signals or the involvement of any external logic, e.g., from one of the chipsets typically supporting a processor in current computer architectures.

Note that the description of the power management control block 207 as including count circuit 217, clock generation circuit 219 and the various control fields 203, 204 and 205 is exemplary and illustrated as such for convenience. Any logic indicated as being part of a single control block may of course be implemented separately.

The description of the invention set forth herein is illustrative, and is not intended to limit the scope of the invention as set forth in the following claims. For instance, the invention described herein may be utilized on various processors and other integrated circuits requiring voltage and clock control capability. Other variations and modifications of the embodiments disclosed herein, may be made based on the description set forth herein, without departing from the scope and spirit of the invention as set forth in the following claims.

What is claimed is:

1. A method for changing frequency of a core clock being supplied to a first logic region of an integrated circuit, comprising:

writing a count storage location in the integrated circuit to specify a duration of a stop grant state during which no code is executed, and during which the first logic region of the integrated circuit is supplied with clocks and power;

entering the stop grant state in response to an access to a predetermined location in the integrated circuit;

starting a count circuit in the processor counting in response to entering the stop grant state; and exiting the stop grant state and resuming execution of code after an interval specified by the count storage and determined according to the count circuit.

2. The method as recited in claim 1 further comprising:

writing a clock control value to a software programmable clock control storage location in the integrated circuit to specify a new frequency for the core clock;

applying the clock control value to clock generation logic; and executing code in the core logic region with the core clock operating at the new frequency after exiting the stop grant state.

3. The method as recited in claim 1 further comprising:

writing a voltage control value to a software programmable voltage control storage location in the processor; and applying the voltage control signals to a voltage control circuit according to the voltage control value after entering the stop grant state.

4. A processor comprising:

a first circuit region coupled to be supplied with a first voltage and coupled to receive a first clock;

a programmable clock frequency control storage location coupled to provide a clock frequency control value specifying a frequency for the first clock;

clock generation logic coupled to receive the clock frequency control value, the clock generation logic being responsive to supply the first clock with the frequency determined according to the clock frequency control value after the processor leaves a stop grant state; and a programmable counter circuit coupled to provide a count signal in response to entering the stop grant state, the count signal indicative of duration of the stop grant state in which operating system and application code is not executed on the processor, and during which the first circuit region is supplied with clocks and power.

5. The processor as recited in claim 4 wherein the clock generation logic transitions during the stop grant state so that the clock generation logic can supply the first clock with the frequency determined according to the clock frequency control value.

6. The processor as recited in claim 4 further comprising a programmable count storage location coupled to provide to the counter circuit a count value indicative of the duration of the stop grant state, the duration providing a period for clocks generated by the clock generation logic and for the voltage, to stabilize.

7. The processor as recited in claim 4 further comprising:

a software programmable voltage control storage location storing software programmable voltage control information specifying the voltage to be supplied to the first circuit region.

8. The processor as recited in claim 7 wherein the voltage control storage location, the core clock frequency storage locations and the counter storage locations comprise one or more registers in the integrated circuit.

9. The integrated circuit as recited in claim 4 wherein the programmable core clock frequency control storage location, the clock generation logic coupled and the counter circuit are powered separately from the core logic region.

10. The integrated circuit as recited in claim 4 wherein the counter circuit receives a clock of a different frequency from the first clock.

11. An integrated circuit comprising:

a first circuit region operable to execute code and operable to enter an internal stop grant state in which no code is executed while being supplied with clocks and power;

a count circuit coupled to provide a signal indicative of a predetermined amount of time having elapsed, the first circuit region responsive to the predetermined amount of time having elapsed to exit from the stop grant state and resume execution of code; and a programmable count storage location coupled to provide to the count circuit a count value, the count value being determinative of the predetermined amount of time in which the integrated circuit is in the stop grant state in which operating system code and application code is not executed.

12. The integrated circuit as recited in claim 11 wherein the internal stop grant state is entered in response to an access to a predetermined location in the integrated circuit.

13. The integrated circuit as recited in claim 12 wherein the access is a read or write instruction executed by the integrated circuit.

14. The integrated circuit as recited in claim 11 wherein the first circuit region transitions to a different voltage during the stop grant state.

15. The integrated circuit as recited in claim 11 further comprising:

a software programmable clock frequency control storage location coupled to provide a clock frequency control value during the stop grant state, the clock frequency control value specifying a frequency for a clock being supplied to the first circuit region; and clock generation logic coupled to receive the clock frequency control value.

16. The integrated circuit as recited in claim 15 wherein the clock generation logic transitions to generate the new frequency during the stop grant state.

17. The integrated circuit as recited in claim 15 wherein the clock supplied to the first circuit region has a frequency determined according to the clock frequency control value after the first circuit region exits the stop grant state.

18. The integrated circuit as recited in claim 11 further comprising:

a software programmable voltage control storage location storing software programmable voltage control information specifying the voltage to be supplied to the first circuit region.

19. The integrated circuit as recited in claim 11 further including one or more registers in the integrated circuit, wherein the registers comprise a voltage control storage location, a core clock frequency storage location and a counter storage location.

20. The integrated circuit as recited in claim 15 wherein the programmable core clock frequency control storage location, the clock generation logic coupled and the counter circuit are powered separately from the core logic region.

21. The integrated circuit as recited in claim 11 wherein the integrated circuit is a processor.

22. The integrated circuit as recited in claim 11 wherein the counter circuit receives a clock of a different frequency from the first clock.

23. A method for changing a voltage and frequency of a clock supplied to a first region of an integrated circuit, comprising:

writing frequency control information into a first programmable storage location in the integrated circuit specifying a new frequency for the clock to be supplied to the first region;

writing voltage control information into a second programmable storage location in the integrated circuit specifying a new voltage to be supplied to the first region;

writing a count value into a third programmable storage location in the integrated circuit;

supplying the count value to a counter in the integrated circuit, the count value to specify a predetermined time period;

entering a stop grant state in which execution of code is stopped on the integrated circuit;

supplying the voltage control information to a voltage regulator;

supplying the new voltage to the first logic region of the integrated circuit after entering the stop grant state; and supplying the frequency control information to clock generation logic on the integrated circuit during the stop grant state;

exiting the stop grant state and resuming execution of code at the new frequency determined according to the frequency control information, after the predetermined time period specified by the count value.

24. The method as recited in claim 23 wherein the first region is a core logic region.

25. The method as recited in claim 23 wherein the integrated circuit is a processor.

26. The method as recited in claim 23 wherein the frequency control information specifies a value by which to multiply a received clock to generate the clock for the first logic region.

* * * * *